March 19, 1963     T. E. HAMILTON     3,082,041
DECORATIVE ATTACHMENT FOR SPOKE WHEELS
Filed March 14, 1961
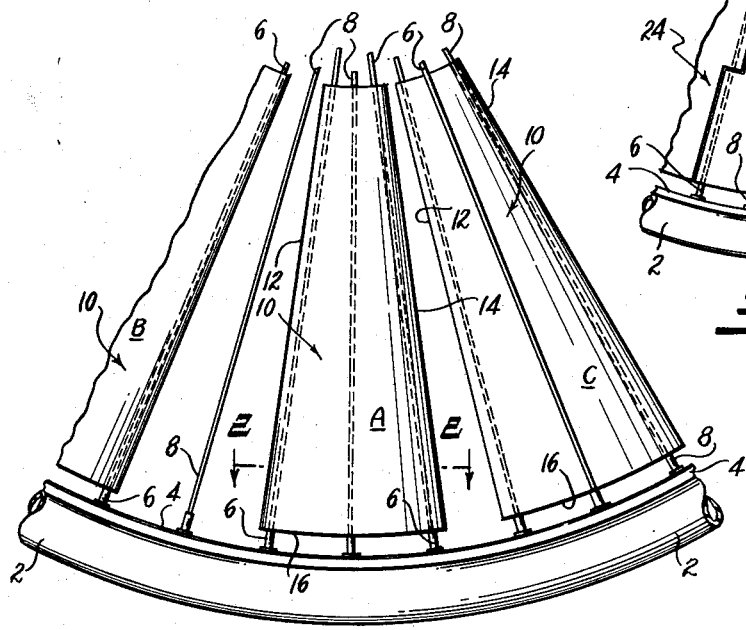
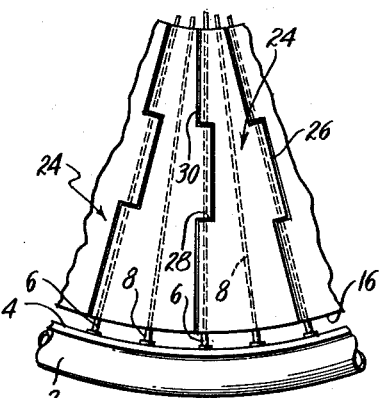
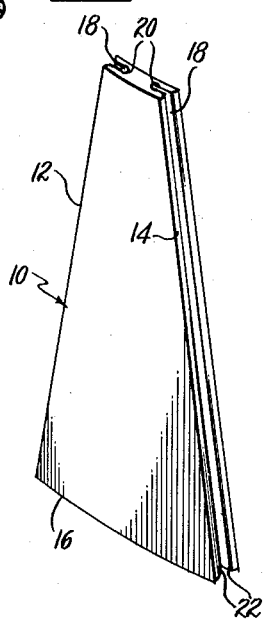
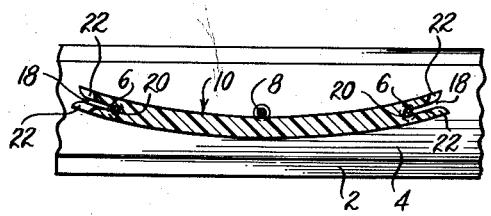
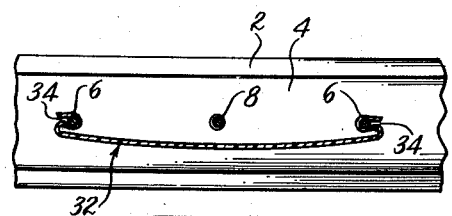
INVENTOR.
Thomas E. Hamilton
BY
Bacon & Thomas
ATTORNEYS

United States Patent Office 3,082,041
Patented Mar. 19, 1963

3,082,041
DECORATIVE ATTACHMENT FOR
SPOKE WHEELS
Thomas E. Hamilton, 101 Larkwood Circle,
Cartersville, Ga.
Filed Mar. 14, 1961, Ser. No. 95,646
2 Claims. (Cl. 301—37)

This invention relates to decorative attachments for spoke wheels and particularly to such attachments for use with bicycle wheels.

In brief, the invention comprises: a plurality of identical devices each comprising essentially a generally flat plate having converging side edges arranged at an angle to each other equal to the angle between spaced spokes of the wheel on which it is to be used. The attachment may be made of a relatively thick sheet of plastic or like material, or it may be folded from thin sheet material of a semi-rigid nature, capable of holding its shape and exhibiting resilience. The converging edges of the attachment are provided with longitudinally extending undercut grooves adapted to snap over spaced spokes to thus releasably but securely hold the attachment on the wheel.

It is therefore an object of this invention to provide a snap-on decorative attachment for spoke wheels which may be arranged in different manners and which is selectively removable although securely held when in position.

Another object of the invention is to provide a device as set forth wherein the attachment is wider than the space between adjacent spokes and arranged to engage spaced spokes with other spokes intermediate thereof to permit substantially full coverage of a wheel area with a minimum number of parts.

It is still another object to provide a decorative attachment as described forming a novel combination with a spoke wheel.

A further object is to provide a device as set forth which is simple and inexpensive to make yet effective and reliable in operation.

Still further objects and advantages will become apparent to those skilled in the art as the description proceeds with reference to the accompanying drawings wherein:

FIG. 1 is a fragmentary side view of a bicycle wheel showing different manners of applying a decorative attachment according to the present invention.

FIG. 2 is a transverse sectional view on an enlarged scale, taken substantially along the line 2—2 of FIG. 1.

FIG. 3 is a perspective view of one of the attachments shown in FIG. 1.

FIG. 4 is a view similar to FIG. 1 but showing a modified form of attachments.

FIG. 5 is a view similar to FIG. 2 but showing a still further modified form of the invention.

FIG. 1 shows a portion of a bicycle wheel comprising a pneumatic tire 2, a rim 4, and spokes 6 and 8. As is well known, the spokes 6 and 8 are alternately secured to opposite ends of an axially elongated hub (not shown). In other words, the spokes 6 are attached to the near end of the hub of the wheel shown and define a cone surface converging outwardly of the illustration, whereas the spokes 8 extend to the other end of the hub and define a second cone surface on the other side of the wheel.

The decorative attachment of the present invention comprises a plate-like member 10 having converging opposed side edges 12 and 14 arranged at an angle to each other substantially equal to the angle between a pair of spokes 6 or 8. The transverse dimension of plate 10, however, is greater than the spacing between those spokes. Preferably, the wide end of each plate 10 is formed to an arcuate edge 16 substantially concentric to the rim 4 of the wheel. Opposite side edges 12 and 14 are provided with longitudinal grooves 18 (FIGS. 2 and 3) therein, extending from end to end of the attachment. The grooves 18 are of a depth greater than the diameter of the spokes and of a width somewhat less than that diameter. At their bottoms, the grooves 18 are undercut to define enlargements 20 of about the same diameter as the spokes. The material of each plate 10 may be of any desired substance; for example, a plastic or the like, but is necessarily semi-rigid and must have some resilience so as to permit the spokes to slightly spread the grooves 18 to snap into the enlargements 20. As shown, the grooves 18 are also provided with divergent outeredge portions 22 serving to guide the wheel spokes into the groove as the attachments are applied to a wheel.

As shown in FIGS. 1 and 2, each attachment must have sufficient resilience to be transversely bent or curved sufficiently to engage and snap on to adjacent spokes 6 or 8. As shown in FIG. 2, an attachment 10 engages adjacent spokes 6 but is curved outwardly to pass alongside an intermediate spoke 8. This curvature may be permanent or not, as desired. It is to be remembered, that the spokes 6 and 8 slope in opposite directions from the plane of the wheel.

A first attachment may be applied to the spokes 6 of a wheel as shown at A in FIG. 1, and a second and succeeding attachments may be applied to the next pair of spokes 6, as shown at B. With this arrangement, an open space is left between the attachments. On the other hand, an attachment may be mounted as shown at A in FIG. 1, and a second decorative attachment attached to spokes 8, on the other side of the wheel, as shown at C. In this arrangement, the spaces between decorative attachments is narrower than in the first arrangement described. Obviously, either or a mixture of both arrangements may be employed.

FIG. 4 shows a modified form of attachment wherein each plate-like member 24 is provided along one edge with a tongue or extension 26 and at its other edge with a notch 28 corresponding in length and position to the tongue 26. The edge 30, in which the notch 28 is formed, is provided with the longitudinal groove described in connection with FIG. 3 only in those portions on opposite sides of the notch 28. At the other edge, only the tongue portion 26 is provided with the described groove. In this manner the attachments may be assembled and applied to the same spokes 6 or 8, on the same side of the wheel and form a continuous decorative surface, uninterrupted by intervening spaces, as clearly illustrated in FIG. 4.

FIG. 5 shows a still further embodiment wherein the decorative plate attachment 32 may be formed to substantially the same outline as the attachments of either FIGS. 1 or 4, but is formed of thin sheet material of insufficient thickness to accommodate the grooves 18. The opposed angularly related edges are reversely bent, as shown in FIG. 5 to form undercut grooves 34 adapted to resiliently and releasably receive the wheel spokes.

Obviously, the decorative attachments described may be colored or otherwise decorated in any desired manner to produce the desired decorative effect.

While a limited number of specific embodiments of the invention have been shown and described herein, it is to be understood that they are merely illustrative of the invention and that other forms may be resorted to within the scope of the appended claims.

I claim:

1. In combination, a bicycle wheel having spokes and a decorative attachment thereon; said attachment comprising a plate of semi-rigid resilient material having longitudinal grooves in opposed edges thereof; said grooves respectively embracing spaced spokes of said wheel; an intermediate spoke between said spaced spokes; said attachment being laterally curved to extend past one side of said intermediate spoke said plate being normally substantially flat but resiliently bendable to curve around said intermediate spoke, as set forth.

2. A decorative attachment for spoke wheels comprising: a plate of semi-rigid resilient material, said plate having converging opposed side edges, and means adjacent and parallel to said side edges and on one side of said plate defining elongated grooves facing outwardly of said edges whereby said plate may be flexed to a laterally curved shape to pass between spaced spokes of a wheel, and to engage said grooves with said spaced spokes and then partially returned by its resilience, to its original unflexed shape to force said spokes into said grooves and thereby removably retain said attachment on the wheel.

References Cited in the file of this patent

UNITED STATES PATENTS

| | | | |
|---|---|---|---|
| D. 88,975 | Majewicz | | Jan. 10, 1933 |
| 680,224 | Camp | | Aug. 13, 1901 |
| 1,510,048 | Evans | | Sept. 30, 1924 |
| 2,344,542 | Fike | | Mar. 21, 1944 |
| 2,621,081 | Mann | | Dec. 9, 1952 |